US012596875B2

(12) United States Patent
Han et al.

(10) Patent No.: US 12,596,875 B2
(45) Date of Patent: Apr. 7, 2026

(54) TECHNIQUES FOR ADAPTIVE LARGE LANGUAGE MODEL USAGE

(71) Applicant: Rubrik, Inc., Palo Alto, CA (US)

(72) Inventors: Seungyeop Han, San Jose, CA (US); Alex Rand, Redwood City, CA (US)

(73) Assignee: Rubrik, Inc., Palo Alto, CA (US)

( * ) Notice: Subject to any disclaimer, the term of this patent is extended or adjusted under 35 U.S.C. 154(b) by 202 days.

(21) Appl. No.: 18/371,344

(22) Filed: Sep. 21, 2023

(65) Prior Publication Data

US 2025/0103809 A1    Mar. 27, 2025

(51) Int. Cl.
*G06F 40/284* (2020.01)
*H04L 51/18* (2022.01)
*H04L 51/216* (2022.01)

(52) U.S. Cl.
CPC ............ *G06F 40/284* (2020.01); *H04L 51/18* (2013.01); *H04L 51/216* (2022.05)

(58) Field of Classification Search
CPC ...... G06F 40/30; G06F 16/3329; G06F 40/40; G06F 40/35; G06F 40/18; G06F 40/216; G06F 16/338; G06F 16/90332; G06F 40/20; G06F 40/279; G06F 21/54; G06F 21/6218; G06F 2221/032; G06F 2221/033; G06F 40/134; G06F 40/169; G06F 40/253; G06F 8/33; G06F 16/3344; G06F 40/166; G06F 40/186; G06F 40/205; G06F 40/289; G06F 40/56; G06F 16/243; G06F 16/287; G06F 16/345; G06F 40/194; G06F 40/284; G06F 40/295; G06F 40/44; G06F 8/37; G06F 11/3608; G06F 11/3624; G06F 11/3684;

G06F 16/31; G06F 16/33; G06F 16/332; G06F 16/335; G06F 16/383; G06F 16/953; G06F 16/9538; G06F 21/563; G06F 21/577; G06F 40/103; G06F 40/109; G06F 40/131; G06F 40/174; G06F 40/211; G06F 40/226; G06F 40/247; G06F 8/30; G06F 8/36; G06F 8/427; G06F 8/77; G06F 9/451; G06F 9/453; G10L 15/22; G10L 21/10;
(Continued)

(56) References Cited

U.S. PATENT DOCUMENTS

| 12,299,015 B2 * | 5/2025 | Krishnan | ............ G06F 16/3329 |
| 2024/0144922 A1 * | 5/2024 | Pandita | ................. G10L 15/183 |

(Continued)

*Primary Examiner* — Abdelali Serrou
(74) *Attorney, Agent, or Firm* — Holland & Hart LLP

(57) ABSTRACT

A method for data management is described. The method includes obtaining data associated with a communication session between a user and a communication service of a data management system (DMS). The method further includes generating a prompt that includes some or all of the data associated with the communication session. The method further includes selecting a large language model (LLM) from a set of LLMs available to the communication service based on a token size of the prompt and a token window size of the LLM. The method further includes transmitting the prompt to the selected LLM and receiving a response from the selected LLM. The method further includes using data from the response in the communication session. In some implementations, if the token size of the prompt exceeds the token window size of the LLM, the DMS may select a different LLM or modify the contents of the prompt.

20 Claims, 7 Drawing Sheets

(58) Field of Classification Search
CPC . G10L 15/26; G10L 15/1815; G10L 15/1822;
G10L 15/183; G10L 2015/223
See application file for complete search history.

(56) References Cited

U.S. PATENT DOCUMENTS

| | | | | |
|---|---|---|---|---|
| 2024/0296177 | A1* | 9/2024 | Gardner | G06F 40/279 |
| 2024/0311582 | A1* | 9/2024 | Schaefer | G06F 11/3608 |
| 2024/0320421 | A1* | 9/2024 | Bursztyn | G06F 40/56 |
| 2024/0378399 | A1* | 11/2024 | Gandhi | G06F 16/345 |
| 2024/0411666 | A1* | 12/2024 | Chan | G06F 21/577 |
| 2024/0419465 | A1* | 12/2024 | Riscutia | G06F 40/166 |
| 2024/0419917 | A1* | 12/2024 | Clement | G06F 40/40 |
| 2025/0036878 | A1* | 1/2025 | Marwah | G06F 40/30 |
| 2025/0086395 | A1* | 3/2025 | Srinivasan | G06F 40/30 |
| 2025/0117412 | A1* | 4/2025 | Jalagam | G06F 16/285 |

* cited by examiner

TECHNIQUES FOR ADAPTIVE LARGE LANGUAGE MODEL USAGE

FIELD OF TECHNOLOGY

The present disclosure relates generally to data management, including techniques for adaptive large language model (LLM) usage.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems, or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

SUMMARY

A method is described. The method includes: obtaining, by a data management system (DMS), data associated with a communication session between a user and a communication service of the DMS; generating, by the DMS, a prompt including some or all of the data associated with the communication session between the user and the communication service of the DMS; selecting, from a set of large language models (LLMs) that are available to the communication service of the DMS, an LLM based on a token size of the prompt and a token window size of the LLM; transmitting, to the selected LLM, the prompt including some or all of the data associated with the communication session between the user and the communication service of the DMS; receiving, from the selected LLM, a response to the prompt including some or all of the data associated with the communication session between the user and the communication service; and including data associated with the response from the selected LLM in the communication session between the user and the communication service of the DMS.

An apparatus is described. The apparatus includes: one or more memories storing code; and one or more processors coupled with the one or more memories. The one or more processors may individually or collectively operable to execute the code to cause the apparatus to: obtain, by a DMS, data associated with a communication session between a user and a communication service of the DMS; generate, by the DMS, a prompt including some or all of the data associated with the communication session between the user and the communication service of the DMS; select, from a set of LLMs that are available to the communication service of the DMS, an LLM based on a token size of the prompt and a token window size of the LLM; transmit, to the selected LLM, the prompt including some or all of the data associated with the communication session between the user and the communication service of the DMS; receive, from the selected LLM, a response to the prompt including some or all of the data associated with the communication session between the user and the communication service; and include data associated with the response from the selected LLM in the communication session between the user and the communication service of the DMS.

Another apparatus is described. The apparatus includes: means for obtaining, by a DMS, data associated with a communication session between a user and a communication service of the DMS; means for generating, by the DMS, a prompt including some or all of the data associated with the communication session between the user and the communication service of the DMS; means for selecting, from a set of LLMs that are available to the communication service of the DMS, an LLM based on a token size of the prompt and a token window size of the LLM; means for transmitting, to the selected LLM, the prompt including some or all of the data associated with the communication session between the user and the communication service of the DMS; means for receiving, from the selected LLM, a response to the prompt including some or all of the data associated with the communication session between the user and the communication service; and means for including data associated with the response from the selected LLM in the communication session between the user and the communication service of the DMS.

A non-transitory computer-readable medium is described. The non-transitory computer-readable medium stores code that includes instructions executable by one or more processors to: obtain, by a DMS, data associated with a communication session between a user and a communication service of the DMS; generate, by the DMS, a prompt including some or all of the data associated with the communication session between the user and the communication service of the DMS; select, from a set of LLMs that are available to the communication service of the DMS, an LLM based on a token size of the prompt and a token window size of the LLM; transmit, to the selected LLM, the prompt including some or all of the data associated with the communication session between the user and the communication service of the DMS; receive, from the selected LLM, a response to the prompt including some or all of the data associated with the communication session between the user and the communication service; and include data associated with the response from the selected LLM in the communication session between the user and the communication service of the DMS.

In some examples of the methods, apparatuses, and non-transitory computer-readable media described herein, selecting the LLM includes operations, features, means, or instructions for selecting the LLM from the set of LLMs based on determining that the token size of the prompt is smaller than the token window size of the LLM.

In some examples of the methods, apparatuses, and non-transitory computer-readable media described herein, selecting the LLM includes operations, features, means, or instructions for selecting the LLM from the set of LLMs based on determining that the token size of the prompt is larger than a token window size of a second LLM of the set of LLMs, where the token window size of the selected LLM is larger than the token window size of the second LLM.

In some examples of the methods, apparatuses, and non-transitory computer-readable media described herein, selecting the LLM includes operations, features, means, or instructions for selecting the LLM from the set of LLMs based on a response latency associated with the LLM, the token window size of the LLM, and the token size of the prompt.

Some examples of the methods, apparatuses, and non-transitory computer-readable media described herein further include operations, features, means, or instructions for:

updating the prompt based on appending second data from the communication session to the data present in the prompt; and selecting a second LLM to process the updated prompt based on the token size of the updated prompt exceeding the token window size of the LLM.

In some examples of the methods, apparatuses, and non-transitory computer-readable media described herein, the token window size of the LLM corresponds to a maximum quantity of tokens the LLM is configured to process for a single prompt.

Some examples of the methods, apparatuses, and non-transitory computer-readable media described herein further include operations, features, means, or instructions for removing one or more tokens from the prompt based on the token size of the prompt exceeding the token window size of the selected LLM.

Some examples of the methods, apparatuses, and non-transitory computer-readable media described herein further include operations, features, means, or instructions for removing one or more tokens from the prompt based on the one or more tokens being outside a rolling time window of the communication session.

In some examples of the methods, apparatuses, and non-transitory computer-readable media described herein, a quantity of the one or more tokens removed from the prompt is based on a difference between the token size of the prompt and the token window size of the selected LLM.

Some examples of the methods, apparatuses, and non-transitory computer-readable media described herein further include operations, features, means, or instructions for: assigning respective weights to a set of messages between the user and the communication service based on metadata associated with the set of messages and a set of weighting criteria associated with the communication session; and removing, from the prompt, one or more tokens that correspond to a message of the set of messages based on a weight assigned to the message and a difference between the token size of the prompt and the token window size of the selected LLM.

Some examples of the methods, apparatuses, and non-transitory computer-readable media described herein further include operations, features, means, or instructions for performing an asynchronous compaction operation on the data associated with the communication session to reduce the token size of the prompt before transmitting the prompt to the selected LLM.

In some examples of the methods, apparatuses, and non-transitory computer-readable media described herein, the response from the selected LLM includes a function call that causes the DMS to trigger one or more actions on behalf of the user.

In some examples of the methods, apparatuses, and non-transitory computer-readable media described herein, generation of the prompt and selection of the LLM are transparent to the user of the communication service.

DETAILED DESCRIPTION

Figure 1:
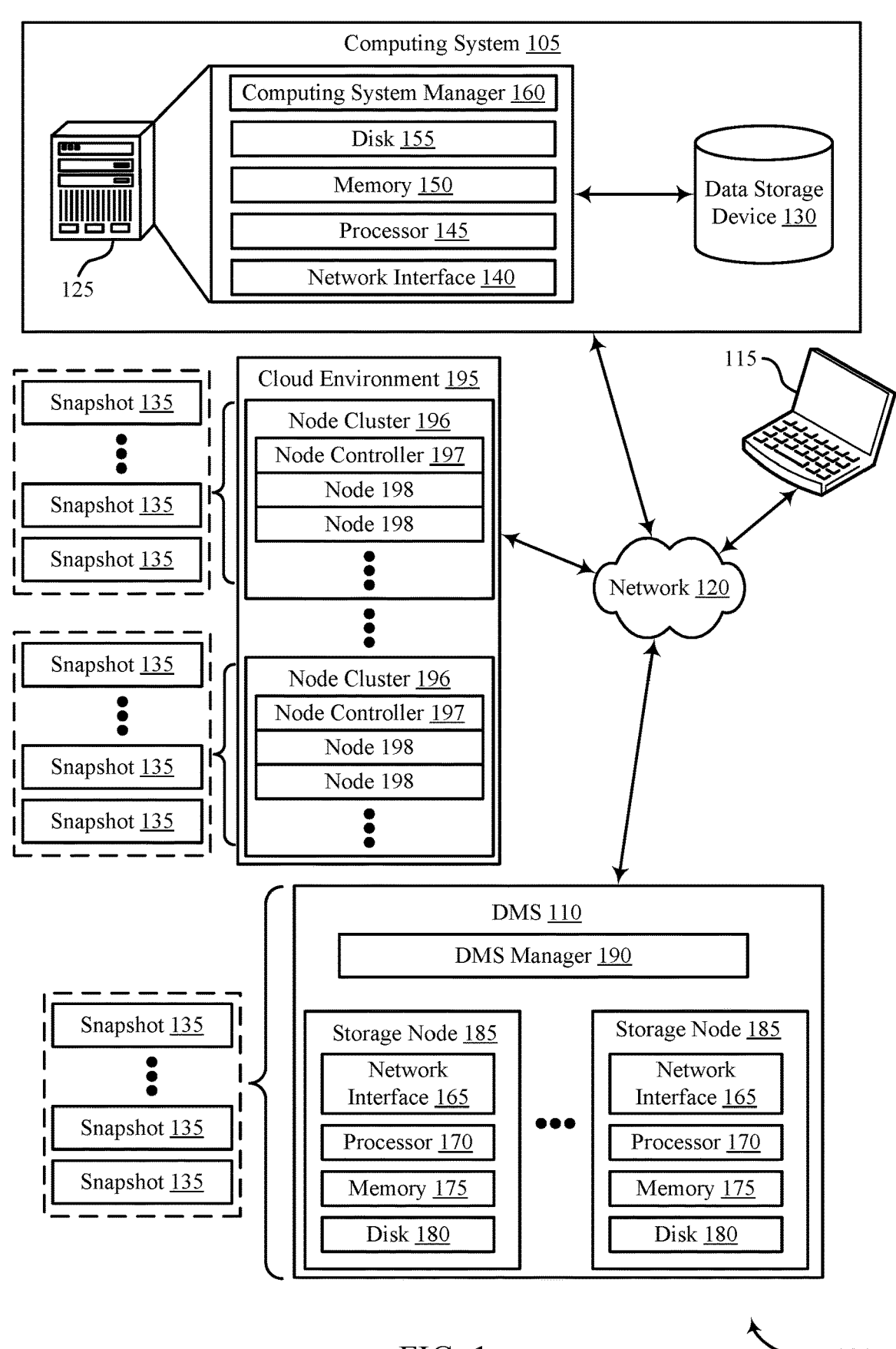
FIGS. 1 and 2 illustrate examples of computing environments that support techniques for adaptive large language model (LLM) usage in accordance with aspects of the present disclosure.

A data management system (DMS) may support a communication service (such as a chatbot or interactive user platform) that enables users to ask questions, troubleshoot problems, initiate workflows, etc. A user may initiate a communication session with the communication service by transmitting a query or other message to the communication service (for example, via a user interface (UI) provided by the DMS). In turn, the communication service may use a large language model (LLM) to process and/or respond to the message submitted by the user. The communication service may send the user's message/query to the LLM in the form of a plain text prompt. To improve the accuracy and/or relevance of responses generated by the LLM, the communication service may include contextual information (e.g., previous messages from the communication session) in the prompt.

In some cases, however, the communication service may be unable to include all relevant context in the prompt, which may affect the accuracy or pertinence of responses generated/predicted by the LLM. For example, if a number of tokens in the prompt exceeds a token window size of the LLM (e.g., the maximum number of preceding tokens the LLM will consider), the LLM may generate responses that are incomplete and/or contextually inaccurate. Using an LLM with a larger token window size may enable the communication service to include more context, but may involve higher latency and operational costs. In contrast, using an LLM with a smaller token window size may yield faster responses (and lower operational costs), but may be unable to handle larger prompts.

Aspects of the present disclosure support techniques for dynamic/adaptive LLM usage based on various parameters, including (but not limited to) prompt token size, token window size, estimated cost, target latency, etc. For example, if a prompt has a smaller token size, the communication service may send the prompt to a first LLM with a smaller token window size (to reduce the latency and/or cost of processing the prompt). If the token size of the prompt exceeds the token window size of the first LLM, the communication service can choose to send the prompt to a second LLM with a larger token window size. Dynamically allocating prompts to different LLMs may improve overall user experience and enable the communication service to process queries with greater efficiency and reduced latency, among other benefits.

In some implementations, the communication service may opportunistically reduce the token size of a given prompt by selectively removing tokens from the prompt (for example, by omitting older and/or less relevant contextual information) or asynchronously compacting the prompt into fewer tokens (for example, using text compression or summarization techniques) before sending the prompt to the selected LLM. In some implementations, the DMS may expose various function calls to a group of LLMs. These function calls can be used to trigger/initiate specific actions within the DMS. For example, if a prompt includes a request to perform a specific action (i.e., restore a database, create a live mount, adjust a cloud retention policy), the LLM can use a corresponding function call to initiate the requested action on behalf of a user.

FIG. 1 illustrates an example of a computing environment 100 that supports techniques for adaptive LLM usage in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.).

Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125.

In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (Saas) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure.

For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable.

Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time).

Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135.

In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware).

Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196 may be associated with the first customer or tenant associated with the computing system 105. The DMS 110 may obtain (e.g., generate or receive) and transfer the snapshots 135 associated with the computing system 105 to the node cluster 196 in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196 in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In accordance with one or more aspects of the present disclosure, the DMS 110 may obtain data associated with a communication session between a user (such as the computing device 115) and a communication service of the DMS 110. The DMS 110 may generate a prompt that includes some or all of the data associated with the communication session. The DMS 110 may select an LLM from a set of LLMs that are available (e.g., accessible) to the communication service based on a token size of the prompt and a token window size of the selected LLM. The DMS 110 may transmit the prompt to the selected LLM and receive a response from the selected LLM. The communication service may include (e.g., post, add) data from the response into the communication session. In some implementations, if the token size of the prompt exceeds the token window size of the LLM, the DMS 110 may select a different LLM or modify the prompt.

Figure 2:
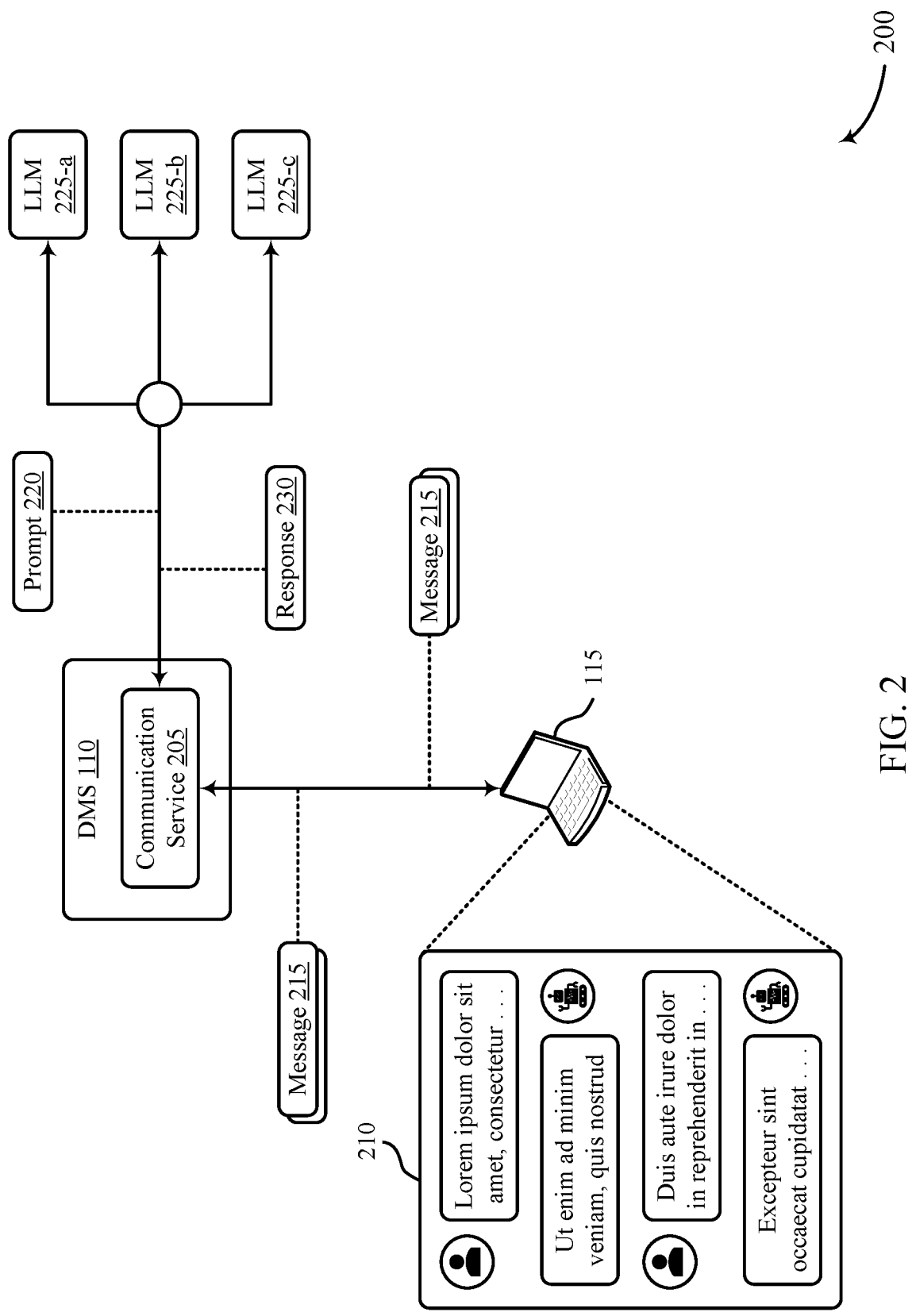

FIG. 2 shows an example of a computing environment 200 that supports techniques for adaptive LLM usage in accordance with aspects of the present disclosure. The computing environment 200 may implement one or more aspects of the computing environment 100. For example, the computing environment 200 includes a DMS 110 and a computing device 115, which may be examples of corresponding elements shown and described with reference to FIG. 1. In the computing environment 200, a communication service 205 of the DMS 110 may establish a communication session 210 with a user of the computing device 115 and use a set of LLMs 225 to handle/process messages 215 received from the user. More specifically, the communication service 205 may include data from the communication session 210 in a prompt 220, which the communication service 205 may direct to one or more of the LLMs 225.

LLMs 225 provide a new way for companies and organizations (such as the DMS 110) to interact with users. As described herein, and LLM 225 generally refers to a type of artificial intelligence (AI) model that is designed to understand and generate human-like text based on patterns and information it learns from various data sources. These models may be trained on large datasets that contain a wide range of human language, such as books, articles, websites, and other written content. There may be several LLMs 225 available to the communication service 205, each with varying costs, latencies, and token window sizes. Using large LLMs 225 (such as GPT-4) can be relatively slow and expensive, though they may be capable of generating more accurate/helpful responses 230 and processing larger prompt text. In contrast, smaller LLMs 225 are generally less expensive and faster, though in some cases they may have a limited token window size for prompting.

When a user establishes a communication session 210 with the communication service 205 (for example, using Microsoft Copilot or other LLM-based services), prompt size may increase over time. LLMs 225 may be stateless. In other words, to get the LLMs 225 to retain/consider all relevant information/context, the communication service 205 may have to include all previous states and context as part of the prompt 220. To provide better user experience and lower operational costs, the communication service 205 may adaptively select which LLM 225 to use based on prompt size. For example, the token size of the prompt 220 may be relatively small at the start of the communication session 210, so the communication service 205 can use an LLM 225-a (such as an open source LLM with a relatively small token window size) to process the prompt 220. Having a smaller token window size may enable the LLM 225-a to create and return a response 230 faster (e.g., in comparison to other LLMs 225 with larger token window sizes).

As the token size of the prompt 220 increases (e.g., as the communication service 205 receives more messages 215 from the user of the computing device 115), the communication service 205 can transition to larger LLMs 225 (such as the LLM 225-b) over time. Dynamically transitioning between LLMs 225 can reduce the latency and operating costs of the communication service 205, since larger LLMs 225 can be on the order of 10 to 100 times more expensive than smaller LLMs 225. In the example of FIG. 2, the communication service 205 may be configured to or otherwise capable of using the LLM 225-a (e.g., a Llama2 model with a 4 k token window size), the LLM 225-b (e.g., a ChatGPT-3.5 model with a 16 k token window size), and the LLM 225-c (e.g., a ChatGPT-4 model with a 32 k token window size).

When a user of the computing device 115 starts a communication session 210 with the communication service 205, the communication service 205 may use the LLM 225-a (e.g., Llama2) until the token size of the prompt 220 exceeds the token window size of the LLM 225-a (e.g., 4 k), at which point the communication service 205 may transition to the LLM 225-b (e.g., ChatGPT-3.5). Once the token size of the prompt 220 exceeds the token window size of the LLM 225-b (e.g., 16 k), the communication service 205 may transition to the LLM 225-c (e.g., ChatGPT-4). Dynamically transitioning between LLMs 225 may enable the communication service 205 to generate content (e.g., responses 230, answers, tips, troubleshooting information) for the communication session 210 using data extracted from the response 230.

In some implementations, the communication service 205 may prune (e.g., condense, filter, or refine) the prompt 220 when the token count of the prompt 220 exceeds the token window size of the LLM 225-c (e.g., the largest model). To do so, the communication service 205 can maintain a rolling window of the prompt 220 and retain a maximal suffix of the prompt 220, such that the prompt 220 meets the token constraints of the LLM 225-c. Alternatively, the communication service 205 may selectively remove one or more tokens from the prompt 220. As described herein, a "token" is a unit of text, which can be a word, a sub-word, or a character.

To remove tokens from the prompt 220, the communication service 205 may assign a weight to each message 215 in the communication session 210 based on various criteria, such as the message's order in the conversation, whether the message 215 answers a follow-up question, whether the message 215 invoked or recommended a function call, etc. Accordingly, the communication service 205 may delete (e.g., evict, remove) messages 215 with the lowest weights, such at the resulting prompt 220 is within the permissible token limit of the selected LLM 225. Additionally, or alternatively, the communication service 205 may use a text summarizing or embedding function, such as BERT, to asynchronously compact message data before sending the prompt to one or more of the LLMs 225.

Figure 3:
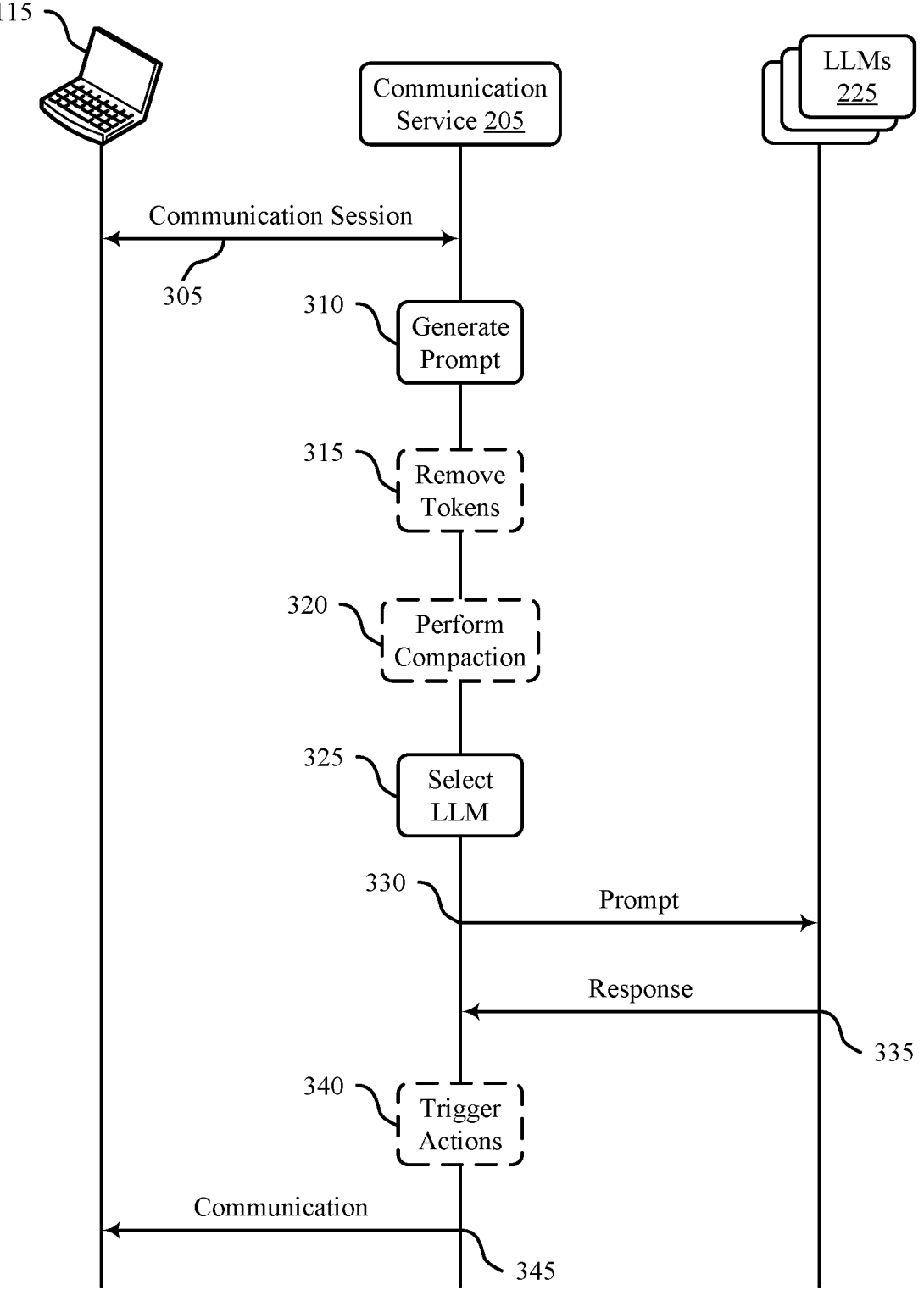
FIG. 3 shows an example of a process flow that supports techniques for adaptive LLM usage in accordance with aspects of the present disclosure.

FIG. 3 shows an example of a process flow 300 that supports techniques for adaptive LLM usage in accordance with aspects of the present disclosure. The process flow 300 may implement one or more aspects of the computing environment 100 or the computing environment 200. For example, the process flow 300 includes a computing device 115, a communication service 205, and a set of LLMs 225, which may be examples of corresponding elements shown and described with reference to FIGS. 1 and 2. In the following description of the process flow 300, operations between the computing device 115, the communication service 205, and the LLMs 225 may be added, omitted, or performed in a different order (with respect to the exemplary order shown).

At 305, the communication service 205 of the DMS 110 may establish a communication session 210 with a user of the computing device 115 via a UI of the DMS 110. The communication session 210 may enable the user to ask questions, troubleshoot errors, request assistance, etc. In some implementations, the communication session 210 may enable the user to trigger specific actions using function calls to the DMS 110. For example, the user can change or update various configuration settings, view data protection metrics, initiate a ransomware investigation, and/or orchestrate an application recovery process by leveraging defined function calls exposed by the DMS 110.

At 310, the communication service 205 of the DMS 110 may generate a prompt 220 that contains data associated with one or more messages 215 of the communication session 210 between the communication service 205 and the user of the computing device 115. The data may include text extracted from a message 215 in the communication session 210 and text/data associated with one or more preceding messages 215 in the communication session 210. The text/data from the one or more preceding messages 215 may serve as context for the LLMs 225, such that the LLMs 225 can formulate a pertinent response 230 to the prompt 220. Each time a new message 215 is sent in the communication session 210, the communication service 205 may update the prompt 220, for example, by appending text from the new message 215 to the previous prompt 220.

In some implementations, at 315, the communication service 205 may remove one or more tokens from the prompt 220 to ensure that the token size of the prompt 220 is less than or equal to a token window size of at least one of the LLMs 225. For example, the communication service 205 may remove one or more tokens associated with messages 215 that are outside a rolling time window of the prompt 220. In other examples, the communication service 205 may assign weights to various messages 215 in the communication session 210 and drop (e.g., remove) the messages 215 with the lowest weights. The communication service 205 may assign weights to messages 215 in the communication session 210 based on various factors including (but not limited to) the time at which a message 215 is sent, the intent/purpose of the message 215, the size of the message 215, whether the message 215 was sent by the user or the communication service 205, etc.

At 320, the communication service 205 may optionally use one or more text summarization or embedding functions (such as BERT) to condense the prompt 220 into fewer tokens, while still preserving the original information/intent of the prompt 220. For example, the communication service 205 may use BERT (or any other suitable text processing algorithm) to reduce the effective size of the prompt 220. In some implementations, the communication service 205 may determine which algorithm/function to use based on the type of text data in the prompt 220, the token window size, etc. In some implementations, the communication service 205 may perform asynchronous text compaction/compression during periods of inactivity, such that the communication service 205 can efficiently process subsequent messages 215 from the user in real-time.

At 325, the communication service 205 may select an LLM 225 from the set of LLMs 225 based on a token size of the prompt 220 and a token window size of the LLM 225. For example, the communication service 205 may select the LLM 225-*a* based on determining that a token size of the prompt 220 is smaller than the token window size of the LLM 225-*a*. Alternatively, if the token size of the prompt 220 is larger than the token window size of the LLM 225-*a*, but smaller than the token window size of the LLM 225-*b*, the communication service 205 may select the LLM 225-*b*. If the token size of the prompt 220 is larger than the token window size of the LLM 225-*b* but smaller than the token window size of the LLM 225-*c*, the communication service 205 may select the LLM 225-*c*. If the token size of the prompt 220 is larger than the token window size of the LLM 225-*c*, the communication service 205 may remove additional tokens from the prompt 220, iteratively compact/prune text in the prompt 220, etc.

At 330, the communication service 205 may send the prompt 220 to the selected LLM 225 based on the token window size of the selected LLM 225, an estimated response latency of the selected LLM 225, an estimated operational cost of using the selected LLM 225 to process the prompt 220, etc. The communication service 205 may transmit the prompt 220 to the selected LLM 225 using one or more APIs provided by the selected LLM 225. In some implementations, the communication service 205 may instruct the selected LLM 225 to return a response 230 in a specific format (for example, as a JavaScript Object Notation (JSON) object).

At 335, the communication service 205 may receive a response 230 from the selected LLM(s) 225. The response 230 may include information extracted from various data sources, such as databases, books, blogs, articles, etc. In some implementations, the selected LLM 225 may generate the response 230 by interacting with the DMS 110 to retrieve data associated with a query or request in the prompt 220. The selected LLM 225 may interact with the DMS 110, for example, using various function calls exposed by the DMS 110. Upon receiving a function call from the selected LLM 225 at 340, the DMS 110 may invoke (e.g., trigger) one or more actions on behalf of the user.

At 345, the communication service 205 may include data from the response 230 in the communication session 210. For example, the communication service 205 may post a message 215 in the communication session 210 that includes text and/or data from the response 230 provided by the selected LLM 225. In some implementations, the communication service 205 may combine text/data from multiple responses 230 into one message 215 that is posted or otherwise displayed in the communication session 210. In some implementations, the prompt generation and/or LLM selection process may be transparent to the user of the computing device 115. In other words, the user may be unaware of the various LLM integrations the communication service 205 uses to process/respond to messages 215 from the user.

Figure 4:
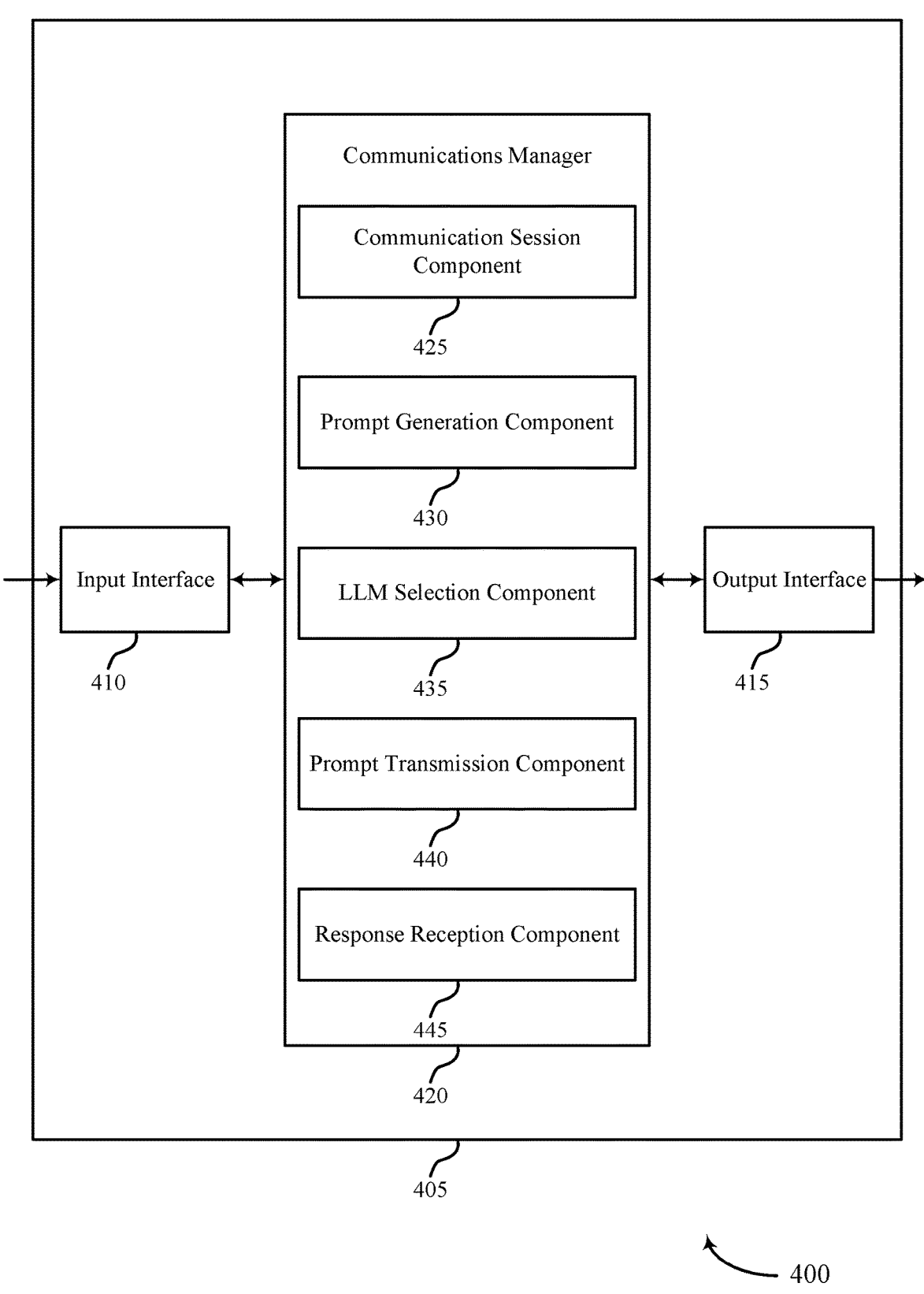
FIG. 4 shows a block diagram of an apparatus that supports techniques for adaptive LLM usage in accordance with aspects of the present disclosure.

FIG. 4 shows a block diagram 400 of a system 405 that supports techniques for adaptive LLM usage in accordance with aspects of the present disclosure. In some examples, the system 405 may be an example of aspects of the DMS 110, as described with reference to FIG. 1. The system 405 may include an input interface 410, an output interface 415, and a communications manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the communications manager 420 to support techniques for adaptive LLM usage. In some cases, the input interface 410 may be a component of a network interface 625, as described with reference to FIG. 6.

The output interface 415 may manage output signaling for the system 405. For example, the output interface 415 may receive signaling from other components of the system 405, such as the communications manager 420, and may transmit such output signaling corresponding to (e.g., representative of or otherwise based on) such signaling to other systems or devices. In some cases, the output interface 415 may be a component of a network interface 625, as described with reference to FIG. 6.

For example, the communications manager 420 may include a communication session component 425, a prompt generation component 430, an LLM selection component 435, a prompt transmission component 440, a response reception component 445, or any combination thereof. In some examples, the communications manager 420, or various components thereof, may be configured to perform various operations (e.g., receiving, monitoring, transmitting) using or otherwise in cooperation with the input interface 410, the output interface 415, or both. For example, the communications manager 420 may receive information from the input interface 410, send information to the output interface 415, or be integrated in combination with the input interface 410, the output interface 415, or both to receive information, transmit information, or perform various other operations as described herein.

The communications manager 420 may support adaptive LLM usage in accordance with examples disclosed herein. The communication session component 425 may be configured as or otherwise support a means for obtaining, by a DMS 110, data associated with a communication session 210 between a user and a communication service 205 of the DMS 110. The prompt generation component 430 may be configured as or otherwise support a means for generating, by the DMS 110, a prompt 220 including some or all of the data associated with the communication session 210 between the user and the communication service 205 of the DMS 110. The LLM selection component 435 may be configured as or otherwise support a means for selecting, from a set of LLMs 225 that are available to the communication service 205 of the DMS 110, an LLM 225 based on a token size of the prompt 220 and a token window size of the LLM 225.

The prompt transmission component 440 may be configured as or otherwise support a means for transmitting, to the selected LLM 225, the prompt 220 including some or all of the data associated with the communication session 210 between the user and the communication service 205 of the DMS 110. The response reception component 445 may be configured as or otherwise support a means for receiving, from the selected LLM 225, a response 230 to the prompt 220 including some or all of the data associated with the communication session 210 between the user and the communication service 205. The communication session component 425 may be configured as or otherwise support a means for including data associated with the response 230 from the selected LLM 225 in the communication session 210 between the user and the communication service 205 of the DMS 110.

Figure 5:
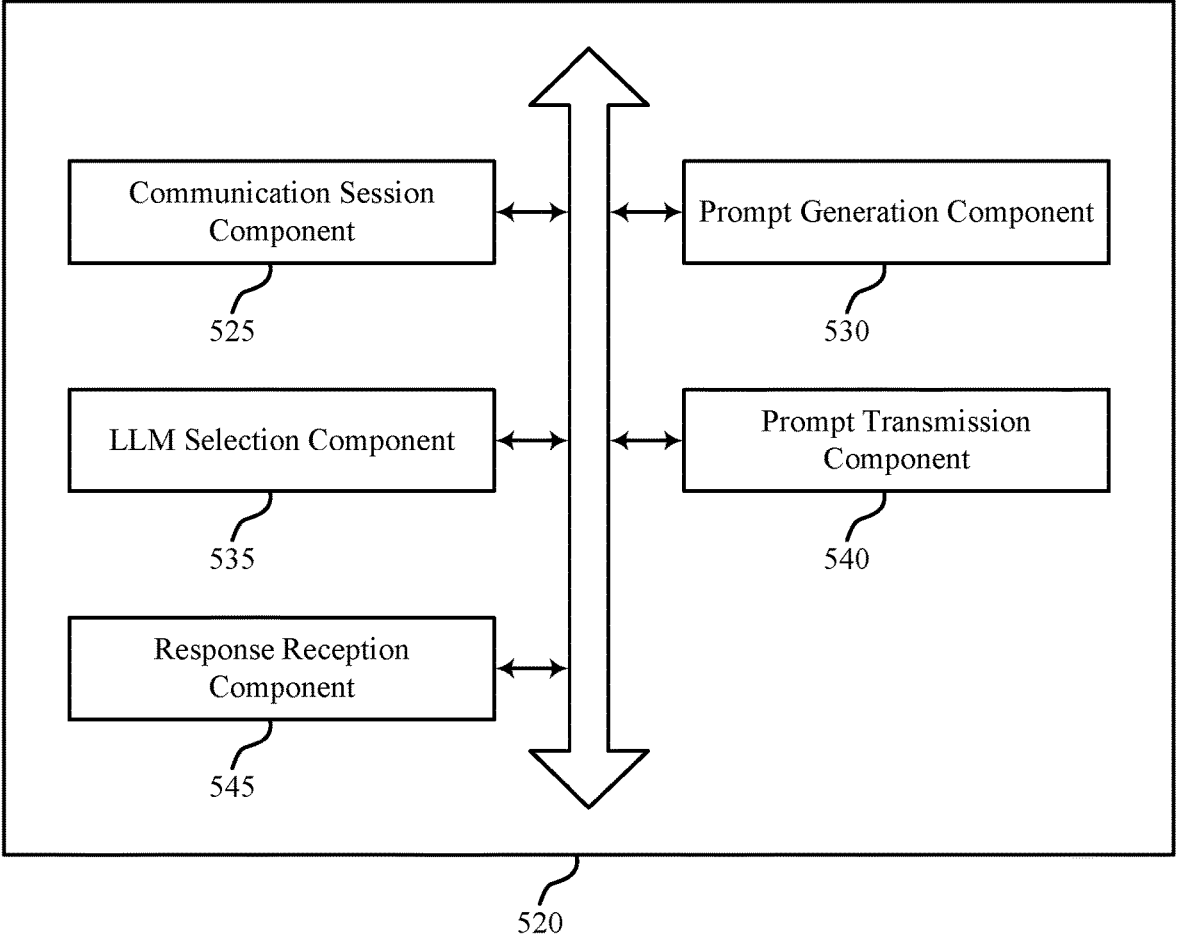
FIG. 5 shows a block diagram of a communications manager that supports techniques for adaptive LLM usage in accordance with aspects of the present disclosure.

FIG. 5 shows a block diagram 500 of a communications manager 520 that supports techniques for adaptive LLM usage in accordance with aspects of the present disclosure. The communications manager 520 may be an example of aspects of a communications manager or a communications manager 420, or both, as described herein. The communications manager 520, or various components thereof, may be an example of means for performing various aspects of the techniques described herein. For example, the communications manager 520 may include a communication session component 525, a prompt generation component 530, an LLM selection component 535, a prompt transmission component 540, a response reception component 545, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The communications manager 520 may support adaptive LLM usage in accordance with examples disclosed herein. The communication session component 525 may be configured as or otherwise support a means for obtaining, by a DMS 110, data associated with a communication session 210 between a user and a communication service 205 of the DMS 110. The prompt generation component 530 may be configured as or otherwise support a means for generating, by the DMS 110, a prompt 220 including some or all of the data associated with the communication session 210 between the user and the communication service 205 of the DMS 110. The LLM selection component 535 may be configured as or otherwise support a means for selecting, from a set of LLMs 225 that are available to the communication service 205 of the DMS 110, an LLM 225 based on a token size of the prompt 220 and a token window size of the LLM 225.

The prompt transmission component 540 may be configured as or otherwise support a means for transmitting, to the selected LLM 225, the prompt 220 including some or all of the data associated with the communication session 210 between the user and the communication service 205 of the DMS 110. The response reception component 545 may be configured as or otherwise support a means for receiving, from the selected LLM 225, a response 230 to the prompt 220 including some or all of the data associated with the communication session 210 between the user and the communication service 205. In some examples, the communication session component 525 may be configured as or otherwise support a means for including data associated with the response 230 from the selected LLM 225 in the communication session 210 between the user and the communication service 205 of the DMS 110.

In some examples, to support selecting the LLM 225, the LLM selection component 535 may be configured as or otherwise support a means for selecting the LLM 225 from the set of LLMs 225 based on determining that the token size of the prompt 220 is smaller than the token window size of the LLM 225.

In some examples, to support selecting the LLM 225, the LLM selection component 535 may be configured as or otherwise support a means for selecting the LLM 225 from the set of LLMs 225 based on determining that the token size of the prompt 220 is larger than a token window size of a second LLM 225 of the set of LLMs 225, where the token window size of the selected LLM 225 is larger than the token window size of the second LLM 225.

In some examples, to support selecting the LLM 225, the LLM selection component 535 may be configured as or otherwise support a means for selecting the LLM 225 from the set of LLMs 225 based on a response latency associated with the LLM 225, the token window size of the LLM 225, and the token size of the prompt 220.

In some examples, the prompt generation component 530 may be configured as or otherwise support a means for updating the prompt 220 based on appending second data from the communication session 210 to the data present in the prompt 220. In some examples, the LLM selection component 535 may be configured as or otherwise support a means for selecting a second LLM 225 to process the updated prompt 220 based on the token size of the updated prompt 220 exceeding the token window size of the LLM 225.

In some examples, the prompt generation component 530 may be configured as or otherwise support a means for removing one or more tokens from the prompt 220 based on the token size of the prompt 220 exceeding the token window size of the selected LLM 225.

In some examples, the prompt generation component 530 may be configured as or otherwise support a means for removing one or more tokens from the prompt 220 based on the one or more tokens being outside a rolling time window of the communication session 210.

In some examples, a quantity of the one or more tokens removed from the prompt 220 is based on a difference between the token size of the prompt 220 and the token window size of the selected LLM 225. In some examples, the token window size of the LLM 225 corresponds to a maximum quantity of tokens the LLM 225 is configured to process for a single prompt 220.

In some examples, the prompt generation component 530 may be configured as or otherwise support a means for assigning respective weights to a set of messages between the user and the communication service 205 based on metadata associated with the set of messages and a set of weighting criteria associated with the communication session 210. In some examples, the prompt generation component 530 may be configured as or otherwise support a means for removing, from the prompt 220, one or more tokens that correspond to a message of the set of messages based on a weight assigned to the message and a difference between the token size of the prompt 220 and the token window size of the selected LLM 225.

In some examples, the prompt generation component 530 may be configured as or otherwise support a means for performing an asynchronous compaction operation on the data associated with the communication session 210 to reduce the token size of the prompt 220 before transmitting the prompt 220 to the selected LLM 225.

In some examples, the response 230 from the selected LLM 225 includes a function call that causes the DMS 110 to trigger one or more actions on behalf of the user. In some examples, generation of the prompt 220 and selection of the LLM 225 are transparent to the user of the communication service 205.

Figure 6:
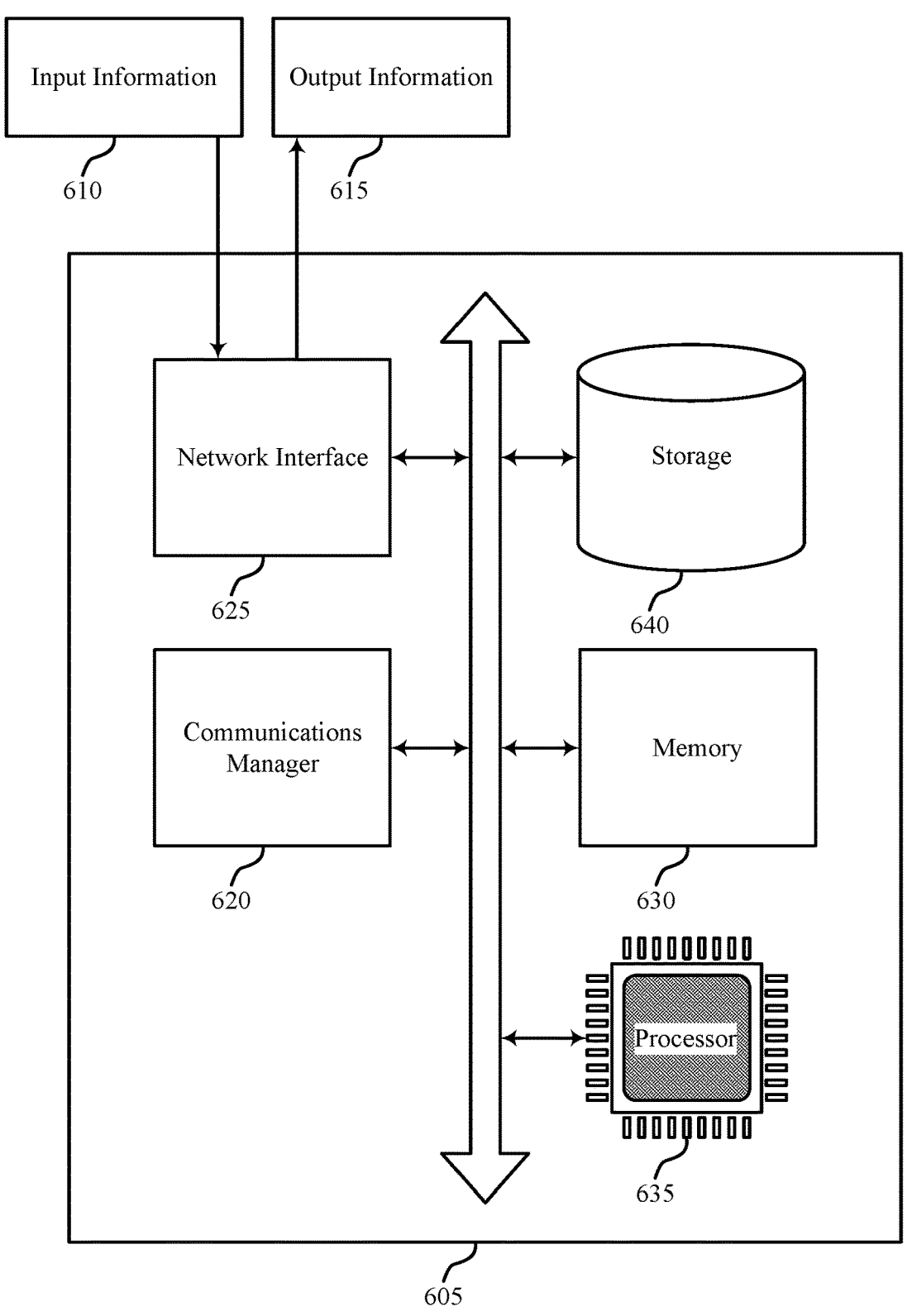
FIG. 6 shows a diagram of a system including a device that supports techniques for adaptive LLM usage in accordance with aspects of the present disclosure.

FIG. 6 shows a block diagram 600 of a system 605 that supports techniques for adaptive LLM usage in accordance with aspects of the present disclosure. The system 605 may be an example of or include the components of a system 405, as described herein. The system 605 may include components for data management, including components such as a communications manager 620, an input information 610, an output information 615, a network interface 625, at least one memory 630, at least one processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a digital signal processor (DSP), a central processing unit (CPU), a micro-controller, an application-specific integrated circuit (ASIC), a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting techniques for adaptive LLM usage). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

The communications manager 620 may support adaptive LLM usage in accordance with examples disclosed herein. For example, the communications manager 620 may be configured as or otherwise support a means for obtaining, by a DMS 110, data associating with a communication session 210 between a user and a communication service 205 of the DMS 110. The communications manager 620 may be configured as or otherwise support a means for generating, by the DMS 110, a prompt 220 including some or all of the data associated with the communication session 210 between the user and the communication service 205 of the DMS 110. The communications manager 620 may be configured as or otherwise support a means for selecting, from a set of LLMs 225 that are available to the communication service 205 of the DMS 110, an LLM 225 based on a token size of the prompt 220 and a token window size of the LLM 225.

The communications manager 620 may be configured as or otherwise support a means for transmitting, to the selected LLM 225, the prompt 220 including some or all of the data associated with the communication session 210 between the user and the communication service 205 of the DMS 110. The communications manager 620 may be configured as or otherwise support a means for receiving, from the selected LLM 225, a response 230 to the prompt 220 including some or all of the data associated with the communication session 210 between the user and the communication service 205. The communications manager 620 may be configured as or otherwise support a means for including data associated with the response 230 from the selected LLM 225 in the communication session 210 between the user and the communication service 205 of the DMS 110.

By including or configuring the communications manager 620 in accordance with examples as described herein, the system 605 may support techniques for adaptive LLM usage, which may provide one or more benefits such as, for example, reduced latency, improved user experience, more efficient utilization of computing resources, and reduced operational costs, among other possibilities.

Figure 7:
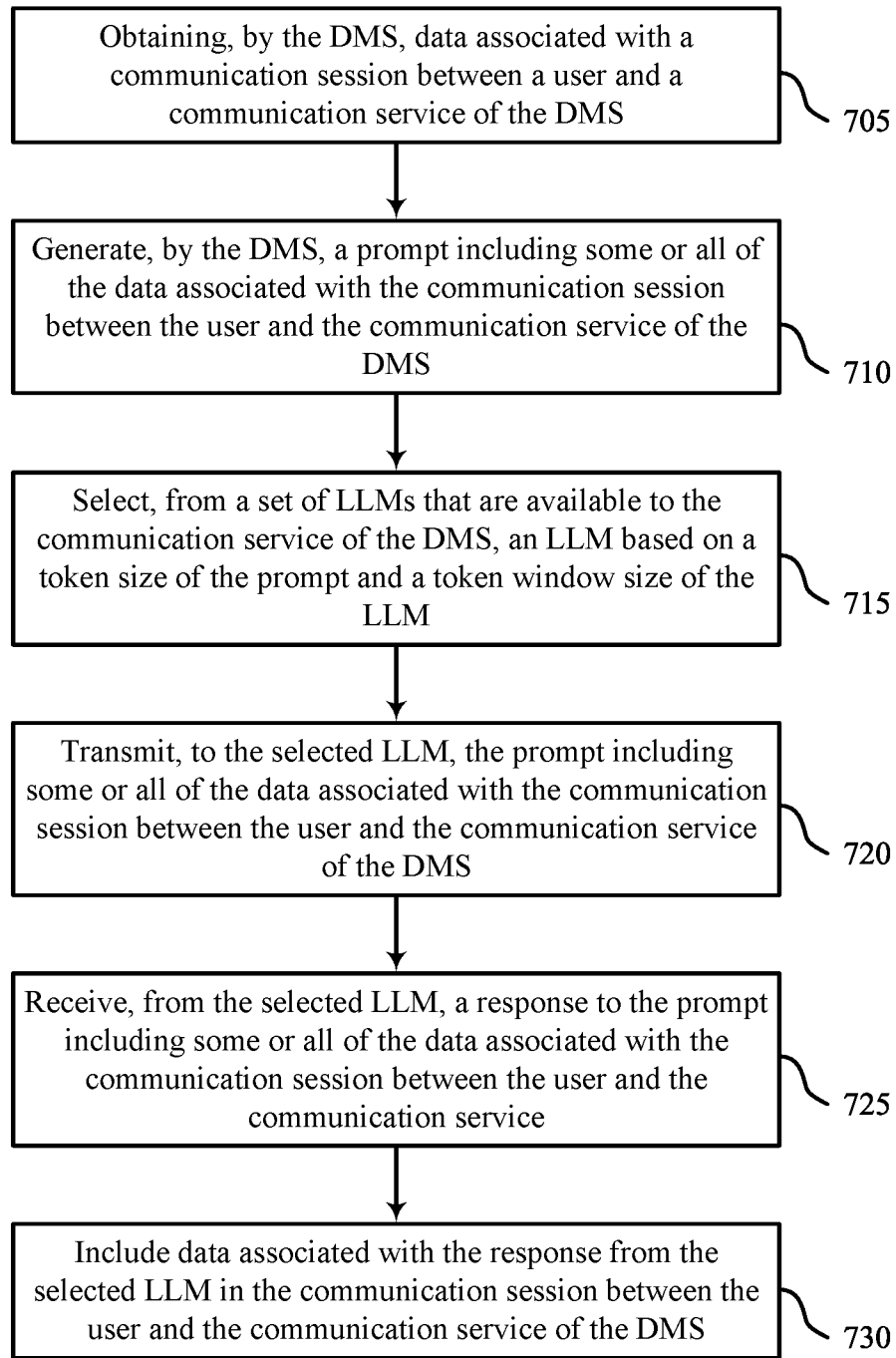
FIG. 7 shows a flowchart illustrating methods that support techniques for adaptive LLM usage in accordance with aspects of the present disclosure.

FIG. 7 shows a flowchart illustrating a method 700 that supports techniques for adaptive LLM usage in accordance with aspects of the present disclosure. The operations of the method 700 may be implemented by a DMS 110 or components thereof. For example, the operations of the method 700 may be performed by a DMS 110, as described with reference to FIGS. 1 through 6. In some examples, the DMS 110 may execute a set of instructions to control the functional elements of the DMS 110 to perform the described functions. Additionally, or alternatively, the DMS 110 may perform aspects of the described functions using special-purpose hardware.

At 705, the method 700 includes obtaining, by the DMS 110, data associated with a communication session 210 between a user and a communication service 205 of the DMS 110. In some examples, aspects of the operations of 705 may be performed by a communication session component 525, as described with reference to FIG. 5.

At 710, the method 700 includes generating, by the DMS 110, a prompt 220 including some or all of the data associated with the communication session 210 between the user and the communication service 205 of the DMS 110. In some examples, aspects of the operations of 710 may be performed by a prompt generation component 530, as described with reference to FIG. 5.

At 715, the method 700 includes selecting, from a set of LLMs 225 that are available to the communication service 205 of the DMS 110, an LLM 225 based on a token size of the prompt 220 and a token window size of the LLM 225. In some examples, aspects of the operations of 715 may be performed by an LLM selection component 535, as described with reference to FIG. 5.

At 720, the method 700 includes transmitting, to the selected LLM 225, the prompt 220 including some or all of the data associated with the communication session 210 between the user and the communication service 205 of the DMS 110. In some examples, aspects of the operations of 720 may be performed by a prompt transmission component 540, as described with reference to FIG. 5.

At 725, the method 700 includes receiving, from the selected LLM 225, a response 230 to the prompt 220 including some or all of the data associated with the communication session 210 between the user and the communication service 205. In some examples, aspects of the operations of 725 may be performed by a response reception component 545, as described with reference to FIG. 5.

At 730, the method 700 includes using data associated with the response 230 from the selected LLM 225 in the communication session 210 between the user and the communication service 205 of the DMS 110. In some examples, aspects of the operations of 730 may be performed by a communication session component 525, as described with reference to FIG. 5.

The following provides an overview of aspects of the present disclosure:

Aspect 1: A method for adaptive LLM usage, comprising: obtaining, by a DMS, data associated with a communication session between a user and a communication service of the DMS; generating, by the DMS, a prompt comprising some or all of the data associated with the communication session between the user and the communication service of the DMS; selecting, from a plurality of LLMs that are available to the communication service of the DMS, an LLM based at least in part on a token size of the prompt and a token window size of the LLM; transmitting, to the selected LLM, the prompt comprising some or all of the data associated with the communication session between the user and the communication service of the DMS; receiving, from the selected LLM, a response to the prompt comprising some or all of the data associated with the communication session between the user and the communication service; and including data associated with the response from the selected LLM in the communication session between the user and the communication service of the DMS.

Aspect 2: The method of aspect 1, wherein selecting the LLM comprises: selecting the LLM from the plurality of LLMs based at least in part on determining that the token size of the prompt is smaller than the token window size of the LLM.

Aspect 3: The method of any of aspects 1 through 2, wherein selecting the LLM comprises: selecting the LLM from the plurality of LLMs based at least in part on determining that the token size of the prompt is larger than a token window size of a second LLM of the plurality of LLMs, wherein the token window size of the selected LLM is larger than the token window size of the second LLM.

Aspect 4: The method of any of aspects 1 through 3, wherein selecting the LLM comprises: selecting the LLM from the plurality of LLMs based at least in part on a response latency associated with the LLM, the token window size of the LLM, and the token size of the prompt.

Aspect 5: The method of any of aspects 1 through 4, further comprising: updating the prompt based at least in part on appending second data from the communication session to the data present in the prompt; and selecting a second LLM to process the updated prompt based at least in part on the token size of the updated prompt exceeding the token window size of the LLM.

Aspect 6: The method of any of aspects 1 through 5, wherein the token window size of the LLM corresponds to a maximum quantity of tokens the LLM is configured to process for a single prompt.

Aspect 7: The method of any of aspects 1 through 6, further comprising: removing one or more tokens from the prompt based at least in part on the token size of the prompt exceeding the token window size of the selected LLM.

Aspect 8: The method of any of aspects 1 through 7, further comprising: removing one or more tokens from the prompt based at least in part on the one or more tokens being outside a rolling time window of the communication session.

Aspect 9: The method of aspect 8, wherein a quantity of the one or more tokens removed from the prompt is based at least in part on a difference between the token size of the prompt and the token window size of the selected LLM.

Aspect 10: The method of any of aspects 1 through 9, further comprising: assigning respective weights to a plurality of messages between the user and the communication service based at least in part on metadata associated with the plurality of messages and a set of weighting criteria associated with the communication session; and removing, from the prompt, one or more tokens that correspond to a message of the plurality of messages based at least in part on a weight assigned to the message and a difference between the token size of the prompt and the token window size of the selected LLM.

Aspect 11: The method of any of aspects 1 through 10, further comprising: performing an asynchronous compaction operation on the data associated with the communication session to reduce the token size of the prompt before transmitting the prompt to the selected LLM.

Aspect 12: The method of any of aspects 1 through 11, wherein the response from the selected LLM comprises a function call that causes the DMS to trigger one or more actions on behalf of the user.

Aspect 13: The method of any of aspects 1 through 12, wherein generation of the prompt and selection of the LLM are transparent to the user of the communication service.

Aspect 14: The method of any of aspects 1 through 12, wherein the communication service is integrated with one or more data backup, recovery, archival, or replication services of the DMS.

Aspect 15: An apparatus for adaptive LLM usage, comprising: one or more memories storing code; and one or more processors coupled with the one or more memories, wherein the one or more processors are individually or collectively operable to execute the code to cause the apparatus to perform a method of any of aspects 1 through 14.

Aspect 16: An apparatus for adaptive LLM usage, comprising at least one means for performing a method of any of aspects 1 through 14.

Aspect 17: A non-transitory computer-readable medium storing code for adaptive LLM usage, the code comprising instructions executable by one or more processors to perform a method of any of aspects 1 through 14.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for adaptive large language model (LLM) usage, comprising:
   obtaining, by a data management system (DMS), data associated with a communication session between a user and a communication service of the DMS;
   generating, by the DMS, a prompt comprising some or all of the data associated with the communication session between the user and the communication service of the DMS;
   selecting, from a plurality of LLMs that are available to the communication service of the DMS, an LLM based at least in part on a token size of the prompt and a token window size of the LLM and based at least in part on a response latency associated with the selected LLM;
   transmitting, to the selected LLM, the prompt comprising some or all of the data associated with the communication session between the user and the communication service of the DMS;
   receiving, from the selected LLM and in accordance with the response latency, a response to the prompt comprising some or all of the data associated with the communication session between the user and the communication service; and
   including data associated with the response from the selected LLM in the communication session between the user and the communication service of the DMS.

2. The method of claim 1, wherein selecting the LLM comprises:

selecting the LLM from the plurality of LLMs based at least in part on determining that the token size of the prompt is smaller than the token window size of the LLM.

3. The method of claim 1, wherein selecting the LLM comprises:
   selecting the LLM from the plurality of LLMs based at least in part on determining that the token size of the prompt is larger than a token window size of a second LLM of the plurality of LLMs, wherein the token window size of the selected LLM is larger than the token window size of the second LLM.

4. The method of claim 1, wherein selecting the LLM comprises:
   selecting the LLM from the plurality of LLMs based at least in part on the response latency associated with the LLM, the token window size of the LLM, and the token size of the prompt.

5. The method of claim 1, further comprising:
   updating the prompt based at least in part on appending second data from the communication session to the data present in the prompt; and
   selecting a second LLM to process the updated prompt based at least in part on the token size of the updated prompt exceeding the token window size of the LLM.

6. The method of claim 1, wherein the token window size of the LLM corresponds to a maximum quantity of tokens the LLM is configured to process for a single prompt.

7. The method of claim 1, further comprising:
   removing one or more tokens from the prompt based at least in part on the token size of the prompt exceeding the token window size of the selected LLM.

8. The method of claim 1, further comprising:
   removing one or more tokens from the prompt based at least in part on the one or more tokens being outside a rolling time window of the communication session.

9. The method of claim 8, wherein a quantity of the one or more tokens removed from the prompt is based at least in part on a difference between the token size of the prompt and the token window size of the selected LLM.

10. The method of claim 1, further comprising:
    assigning respective weights to a plurality of messages between the user and the communication service based at least in part on metadata associated with the plurality of messages and a set of weighting criteria associated with the communication session; and
    removing, from the prompt, one or more tokens that correspond to a message of the plurality of messages based at least in part on a weight assigned to the message and a difference between the token size of the prompt and the token window size of the selected LLM.

11. The method of claim 1, further comprising:
    performing an asynchronous compaction operation on the data associated with the communication session to reduce the token size of the prompt before transmitting the prompt to the selected LLM.

12. The method of claim 1, wherein the response from the selected LLM comprises a function call that causes the DMS to trigger one or more actions on behalf of the user.

13. The method of claim 1, wherein generation of the prompt and selection of the LLM are transparent to the user of the communication service.

14. The method of claim 1, wherein the communication service is integrated with one or more data backup, recovery, archival, or replication services of the DMS.

15. An apparatus for adaptive large language model (LLM) usage, comprising:

one or more memories storing code; and one or more processors coupled with the one or more memories and individually or collectively operable to execute the code to cause the apparatus to:

obtain, by a data management system (DMS), data associated with a communication session between a user and a communication service of the DMS;

generate, by the DMS, a prompt comprising some or all of the data associated with the communication session between the user and the communication service of the DMS;

select, from a plurality of LLMs that are available to the communication service of the DMS, an LLM based at least in part on a token size of the prompt and a token window size of the LLM and based at least in part on a response latency associated with the selected LLM;

transmit, to the selected LLM, the prompt comprising some or all of the data associated with the communication session between the user and the communication service of the DMS;

receive, from the selected LLM and in accordance with the response latency, a response to the prompt comprising some or all of the data associated with the communication session between the user and the communication service; and include data associated with the response from the selected LLM in the communication session between the user and the communication service of the DMS.

16. The apparatus of claim 15, wherein to select the LLM, the one or more processors are individually or collectively operable to execute the code to cause the apparatus to:

select the LLM from the plurality of LLMs based at least in part on determining that the token size of the prompt is smaller than the token window size of the LLM.

17. The apparatus of claim 15, wherein to select the LLM, the one or more processors are individually or collectively operable to execute the code to cause the apparatus to:

select the LLM from the plurality of LLMs based at least in part on determining that the token size of the prompt is larger than a token window size of a second LLM of the plurality of LLMs, wherein the token window size of the selected LLM is larger than the token window size of the second LLM.

18. The apparatus of claim 15, wherein to select the LLM, the one or more processors are individually or collectively operable to execute the code to cause the apparatus to:

select the LLM from the plurality of LLMs based at least in part on the response latency associated with the LLM, the token window size of the LLM, and the token size of the prompt.

19. The apparatus of claim 15, wherein the one or more processors are further operable to execute the code to cause the apparatus to:

update the prompt based at least in part on appending second data from the communication session to the data present in the prompt; and select a second LLM to process the updated prompt based at least in part on the token size of the updated prompt exceeding the token window size of the LLM.

20. A non-transitory computer-readable medium storing code for adaptive large language model (LLM) usage, the code comprising instructions executable by one or more processors to:

obtain, by a data management system (DMS), data associated with a communication session between a user and a communication service of the DMS;

generate, by the DMS, a prompt comprising some or all of the data associated with the communication session between the user and the communication service of the DMS;

select, from a plurality of LLMs that are available to the communication service of the DMS, an LLM based at least in part on a token size of the prompt and a token window size of the LLM and based at least in part on a response latency associated with the selected LLM;

transmit, to the selected LLM, the prompt comprising some or all of the data associated with the communication session between the user and the communication service of the DMS;

receive, from the selected LLM and in accordance with the response latency, a response to the prompt comprising some or all of the data associated with the communication session between the user and the communication service; and include data associated with the response from the selected LLM in the communication session between the user and the communication service of the DMS.

* * * * *